Figure 1:
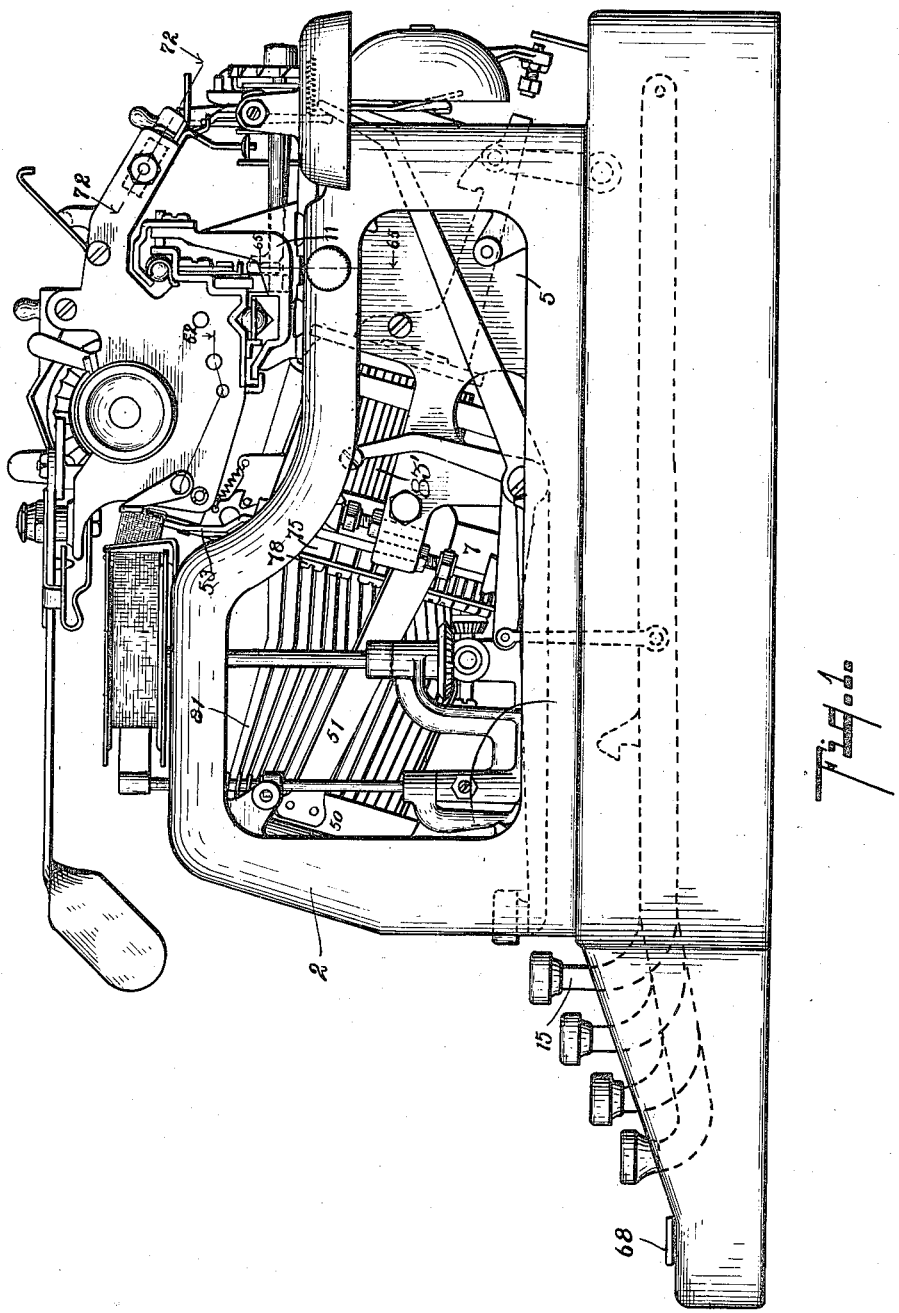

W. R. FOX.
TYPE WRITING MACHINE.
APPLICATION FILED OCT. 18, 1909.

1,193,774.

Patented Aug. 8, 1916.
10 SHEETS—SHEET 1.

Witnesses
Flora E. Broden
F. Gertrude Tallman

Inventor
William R. Fox
By Chappell & Earl
Attorneys

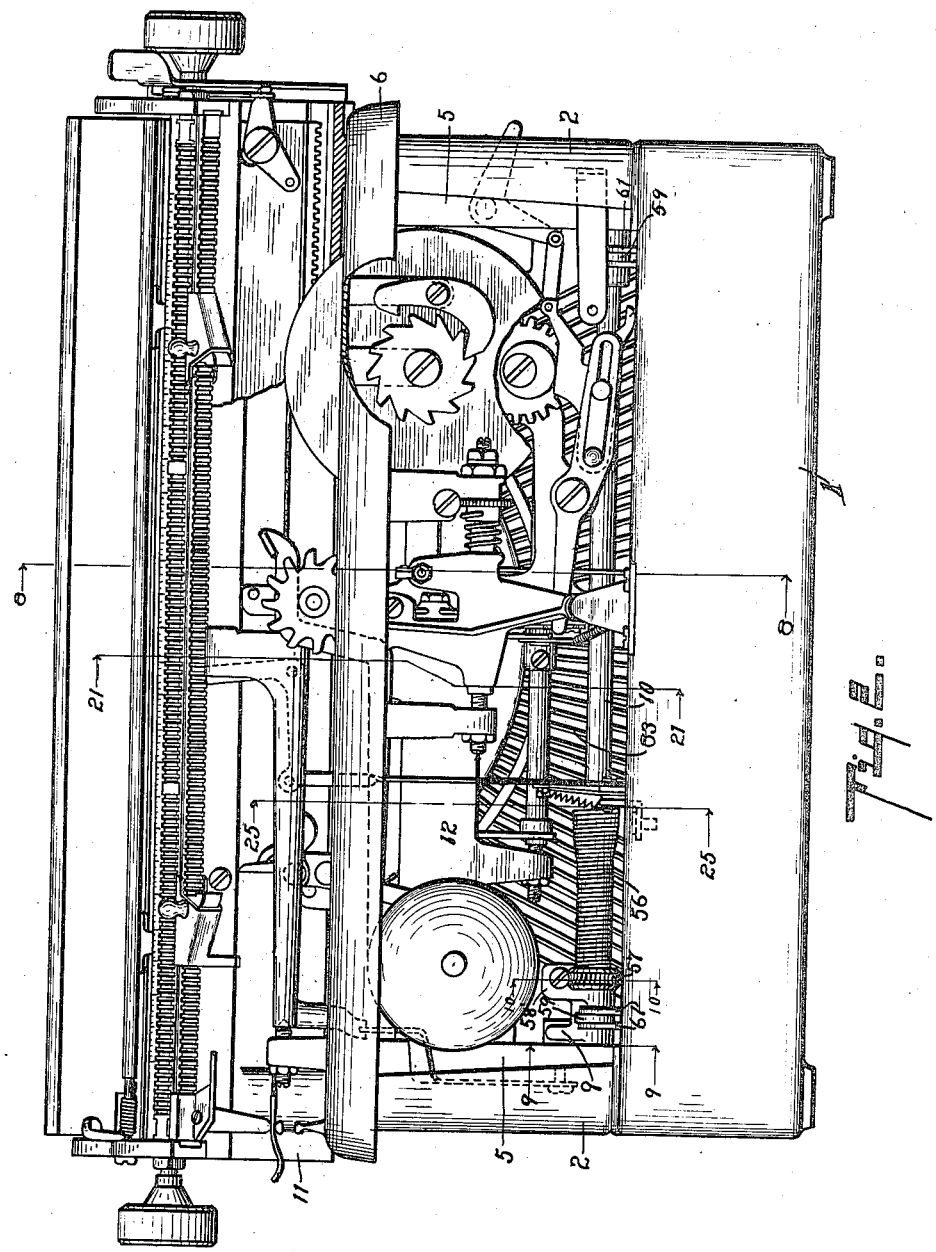

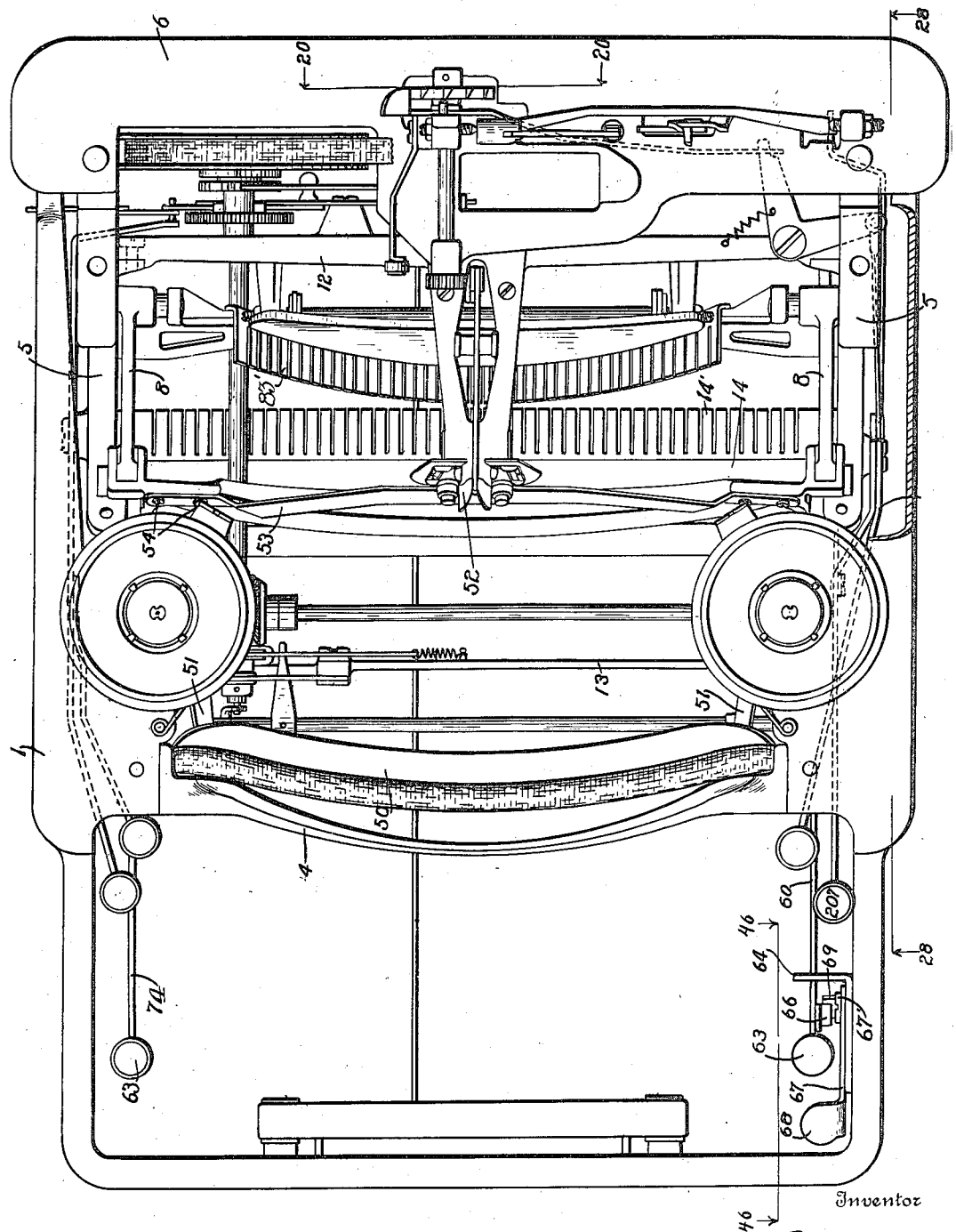

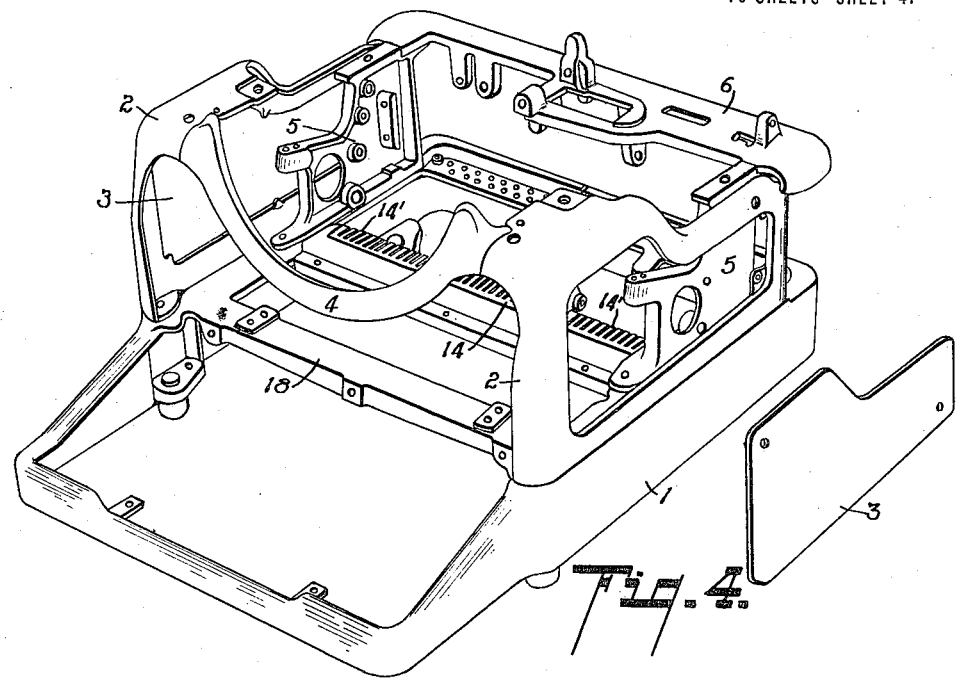
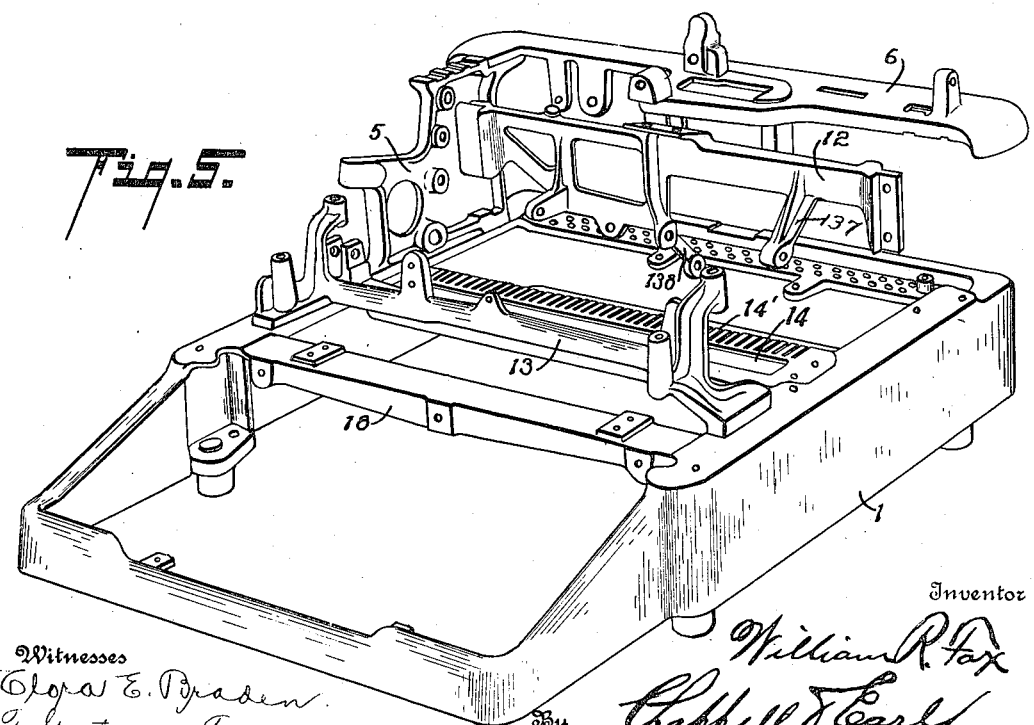

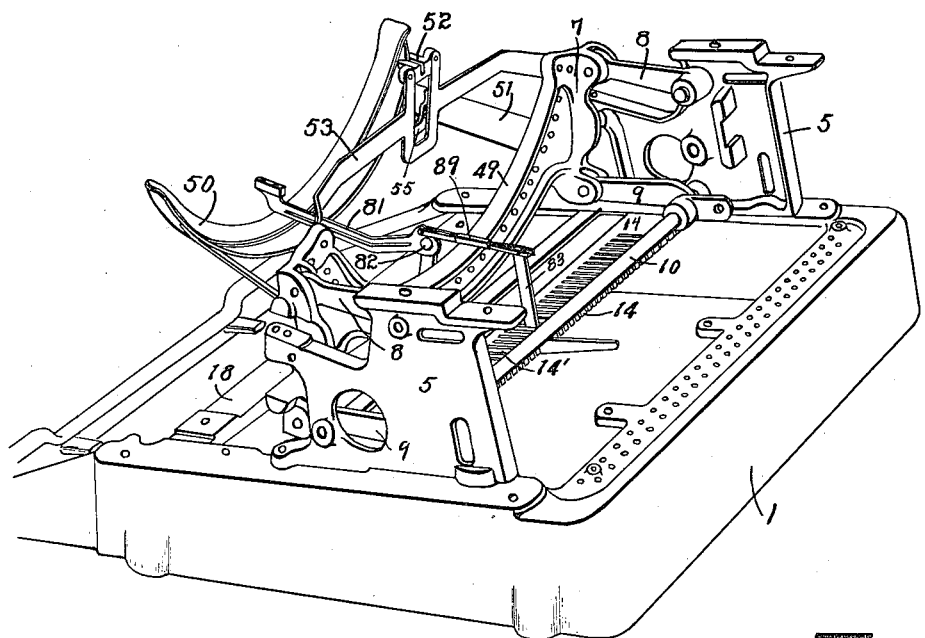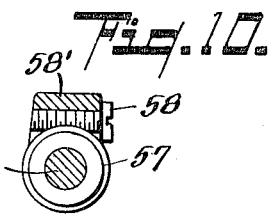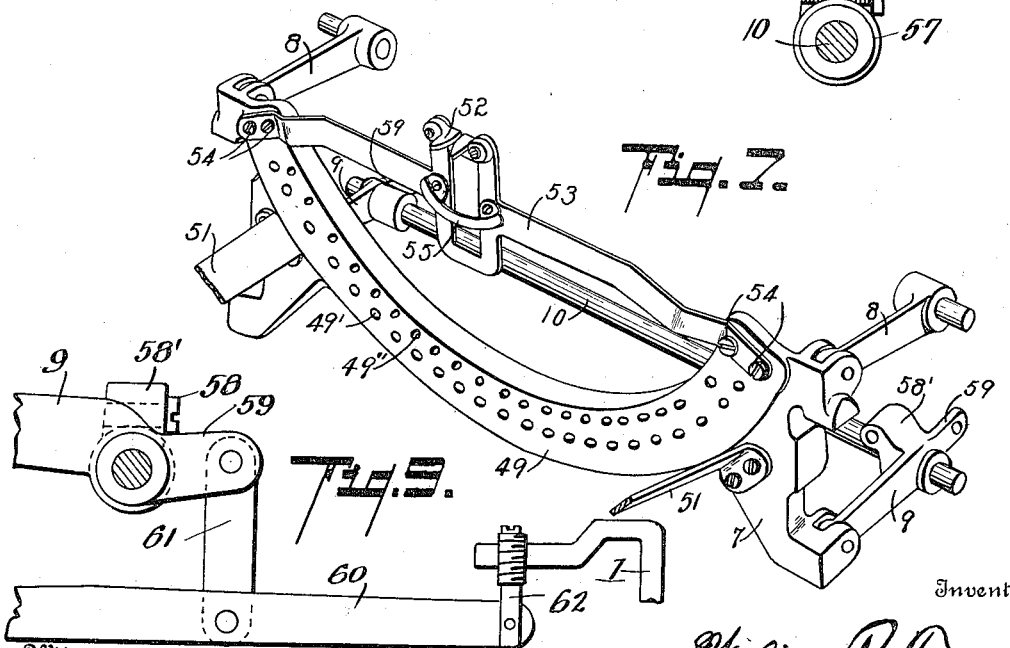

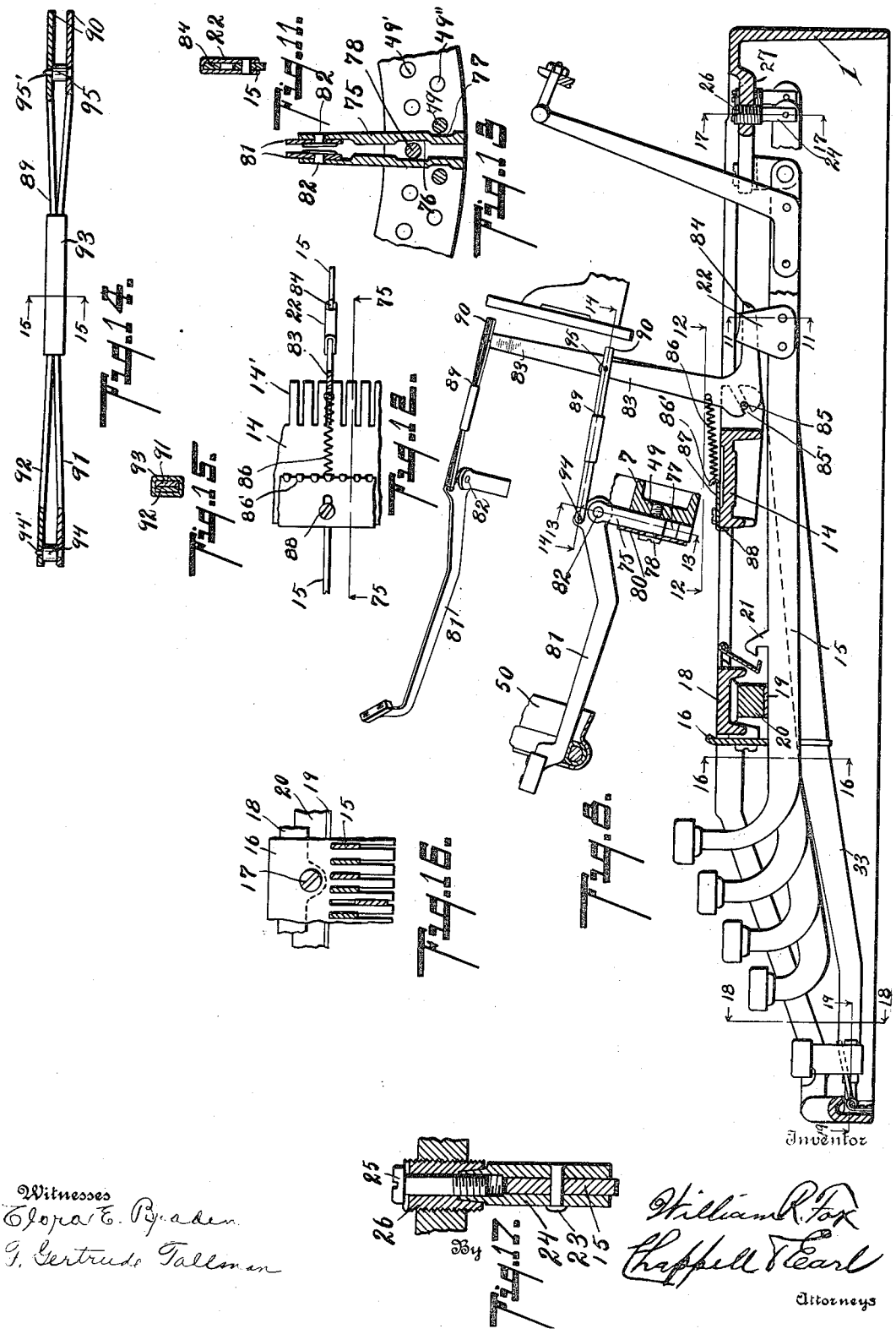

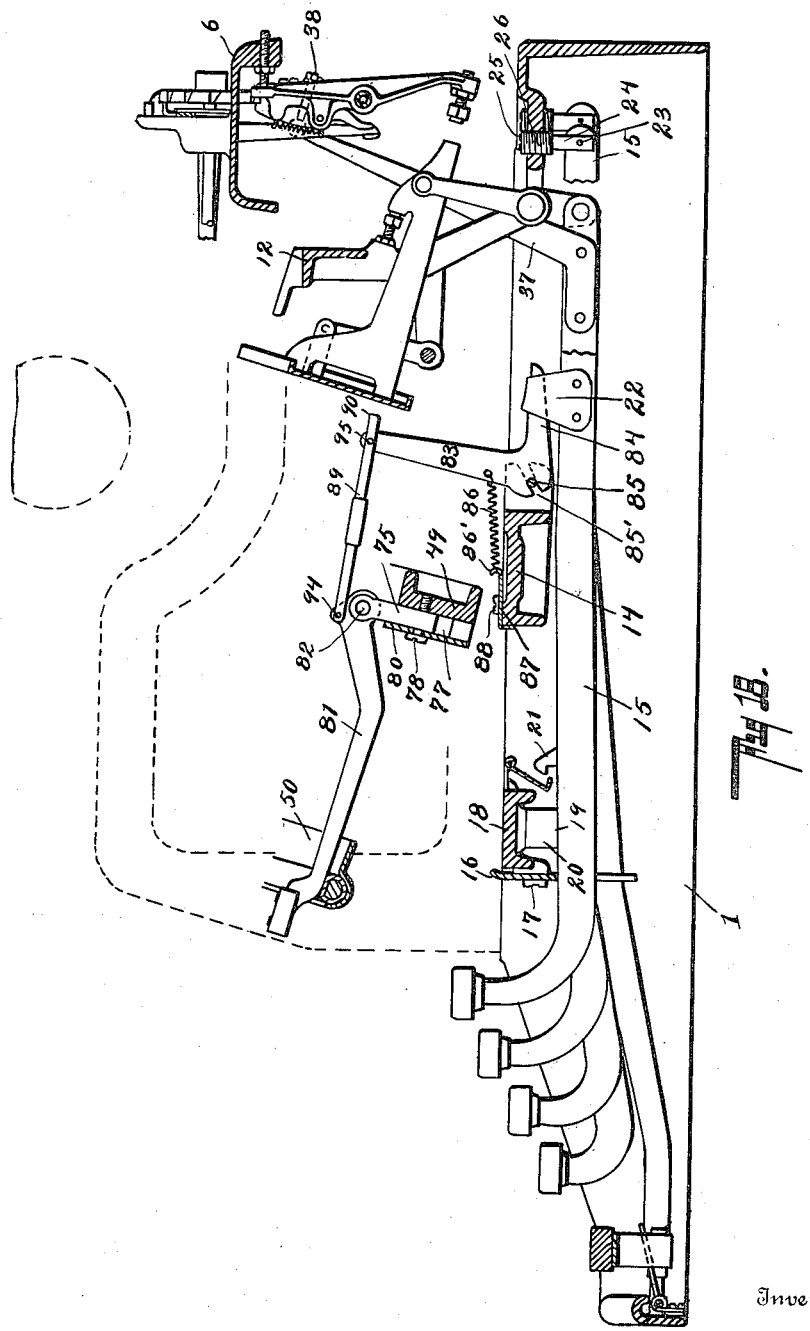

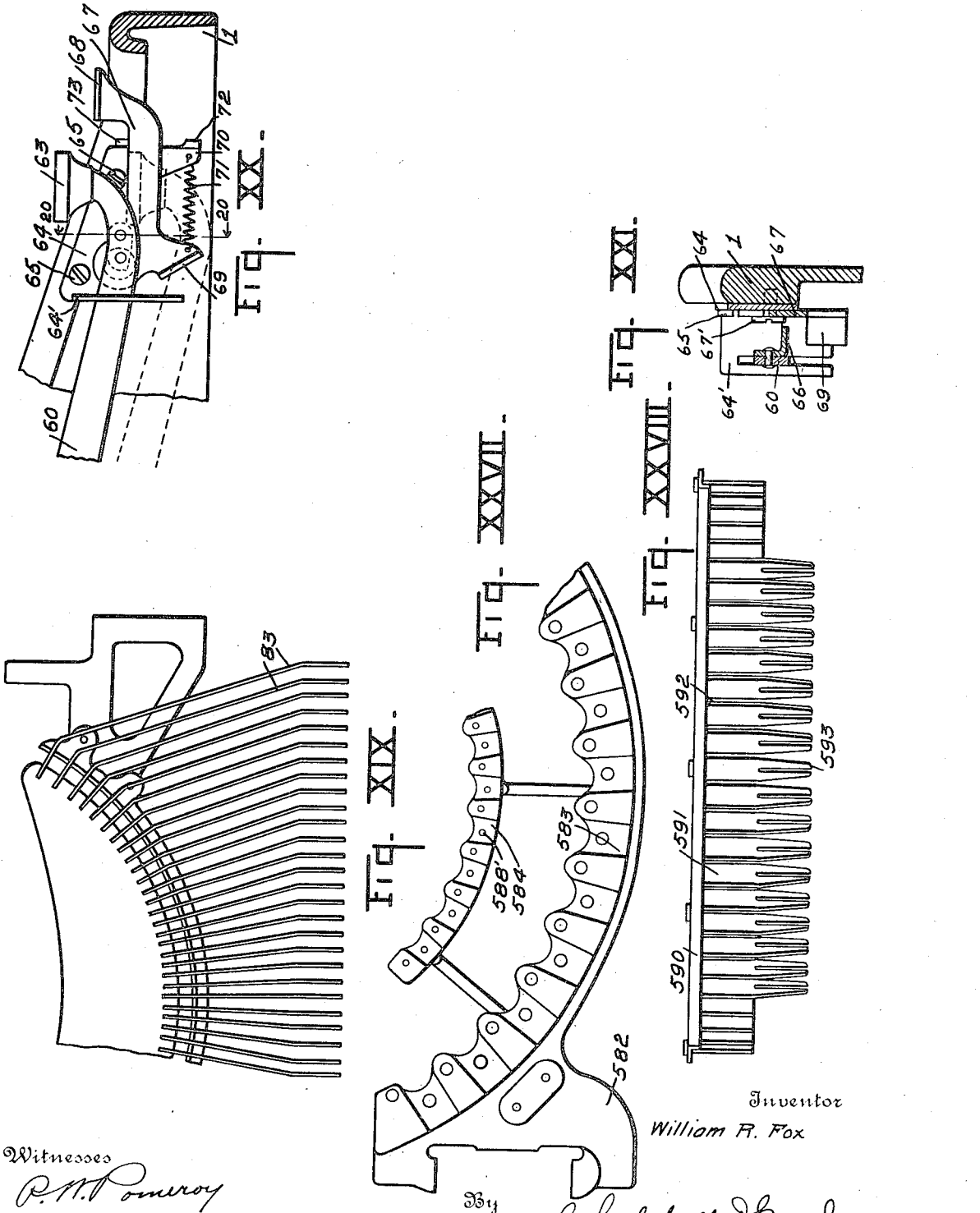

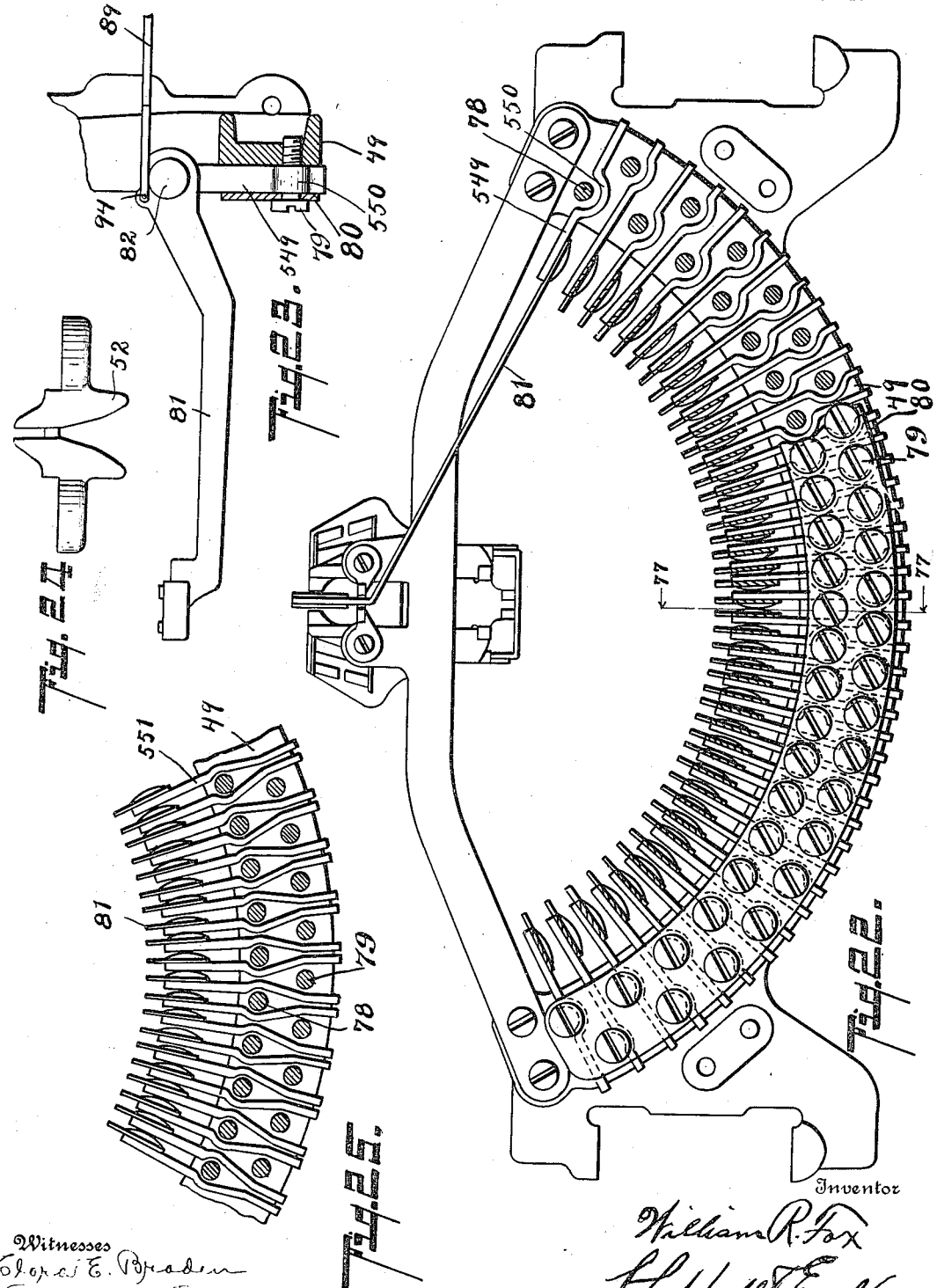

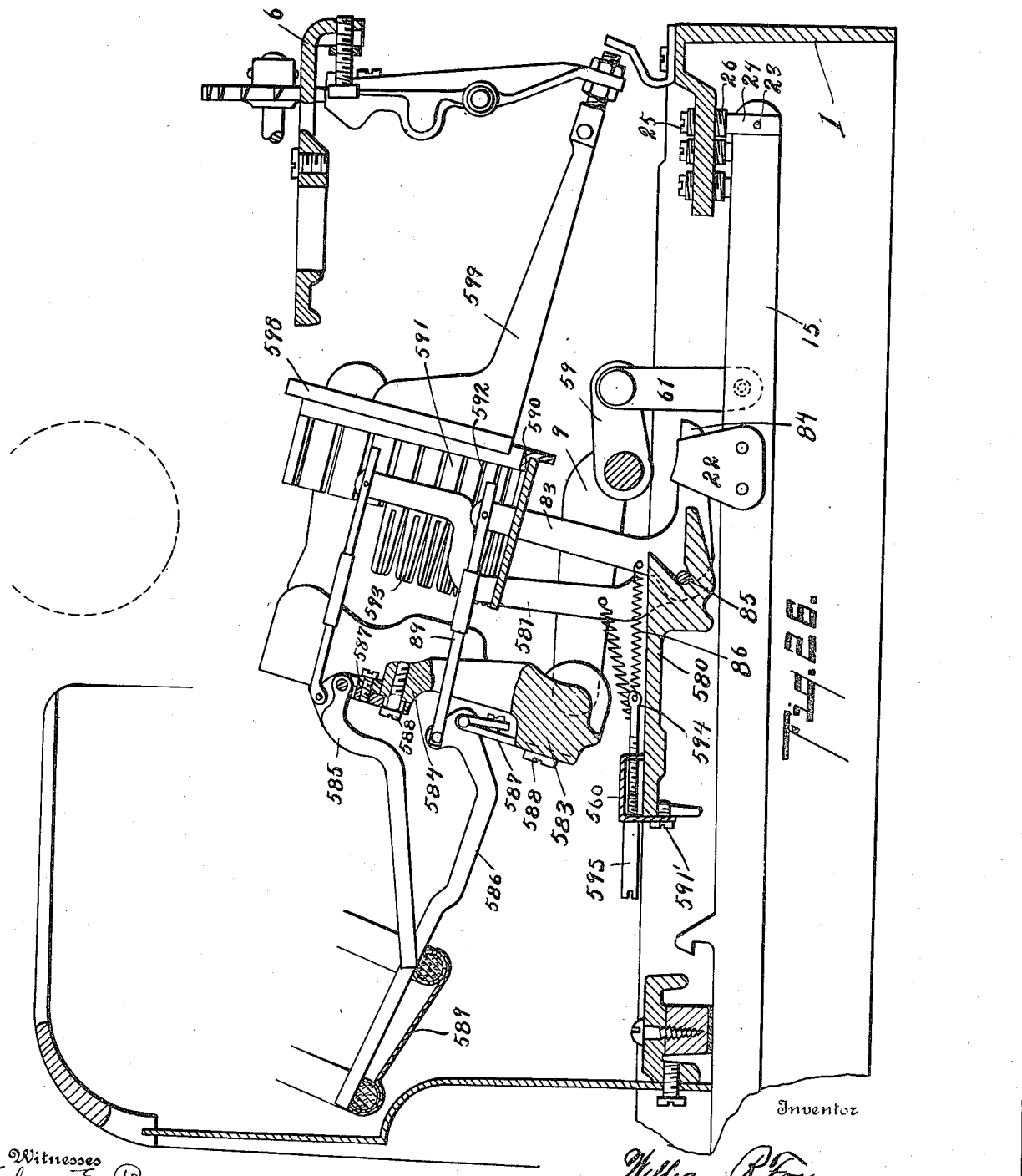

UNITED STATES PATENT OFFICE.

WILLIAM R. FOX, OF GRAND RAPIDS, MICHIGAN.

TYPE-WRITING MACHINE.

1,193,774.

Specification of Letters Patent. Patented Aug. 8, 1916.

Application filed October 18, 1909. Serial No. 523,240.

*To all whom it may concern:*

Be it known that I, WILLIAM R. FOX, a citizen of the United States, residing at Grand Rapids, county of Kent, State of Michigan, have invented certain new and useful Improvements in Type-Writing Machines, of which the following is a specification.

This invention relates to improvements in type-writing machines.

It relates to the entire typewriter mechanism.

The features are especially adapted to the front strike machine, though they are available in other styles of machines.

The main objects of this invention are to simplify and improve,—first, the general frame-work and structure of the machine by dividing the same in a special manner into parts in such a way as to enable the manufacture of the different parts as units, so that they can be readily assembled in the entire machine; second, the shiftable type-bar support and type guide; third, the shifting port and type guide; third, the shifting mechanism for the type-bar support; fourth, the counterbalance for the shifting mechanism for the type-bar support; fifth, the levers for shifting the type-bar support and the locking means therefor; sixth, the type-bar hangers and means for attaching the same to the type-bar support; seventh, the type action as a whole, including the rock lever, its connections, tension and the top coupler.

I accomplish the objects of my invention by the devices and means described in the following specification. The invention is clearly defined and pointed out in the appended claims.

A structure embodying the features of my improved typewriter is embodied and described in the following specification and fully illustrated in the accompanying drawing, in which:—

Figure 1 is a side elevation view of my improved machine from the righthand side, showing details of the various parts to which my improvements relate, certain internal portions and their relations being indicated by dotted lines. Fig. 2 is a rear elevation view of my improved machine, with portions broken away to show details of the back spacer and other parts, certain internal parts and their connections being indicated by dotted lines. Fig. 3 is a plan view of my improved machine, showing the relation of the various parts, the platen, carriage and key levers being omitted. Fig. 4 is a perspective view from the right front of the general frame-work with the operating parts removed, showing details of the assembled frame, the carriage frame and the ribbon gear frame being omitted, and the side plate being shown in detached relation. Fig. 5 is a similar detail view with sides and upper front portion of the frames omitted, and the front and rear ribbon frames shown in position with all moving parts omitted. Fig. 6 is a perspective view from the righthand rear corner of the machine, showing the base and inner frame, the outer frame or shell and ribbon mechanism frames being omitted, showing the details of construction of the type-carrying frame, or segment, a single type-bar and its connection down to the key levers being present, the key levers and their devices not being present. Fig. 7 is an enlarged perspective view of the type-bar support and its supporting means and the type guide carried thereby. Fig. 8 is a longitudinal detail vertical sectional elevation, taken on a line corresponding to line 8—8 of Fig. 2, showing the complete type action and spacer mechanism. Fig. 9 is a detail of the shifting lever which controls the shifting of the type-bar supports or carriers, taken on a line corresponding to line 9—9 of Fig. 2. Fig. 10 is an enlarged detail sectional view of the adjusting means for putting tension on the counterbalance spring for the shiftable type-bar support, taken on a line corresponding to line 10—10 of Fig. 2. Fig. 11 is a detail transverse sectional view, taken on a line corresponding to line 11—11 of Fig. 8, showing the connection between the key levers and the intermediate rocking levers. Fig. 12 is a detail plan view, in section, taken on line 12—12 of Fig. 8, showing the tension spring connection and means of adjusting the same for controlling the tension on all rock levers at the same time. Fig. 13 is an enlarged detail sectional view on line 13—13 of Fig. 8, showing the method of connecting the type-bar hangers to the shiftable type-bar support. Fig. 14 is an enlarged detail view of the top coupler for a rock lever to a type-bar, the pivotal connection being shown in section on a line corresponding to line 14—14 of Fig. 8. Fig.

15 is a detail transverse sectional view, taken on a line 15—15 of Fig. 14, showing the method of assembling the parts of the top coupling. Fig. 16 is an enlarged detail sectional view, through the key levers and their guiding comb, taken on a line corresponding to line 16—16 of Fig. 8, the shift key also appearing on a lower plane. Fig. 17 is an enlarged detail sectional view on line 17—17 of Fig. 8, showing the details of construction of the adjustable pivotal support and connection for the rear ends of the key levers. Fig. 18 is a longitudinal vertical sectional elevation view to show the typewriter embodying the features of my invention, showing the complete type action, spacer mechanism, universal bar and escapement means in their proper relation to each other, the platen and end portion of the frame of the machine being indicated by dotted lines. Fig. 19 is a front elevation of the rock levers in their relation to the universal bar and their comb and the bracket support for the said comb, the elevation being not quite vertical, but a little inclined toward the rear so that it is at right angles to the position of the said upwardly-projecting portions of the rock levers. Fig. 20 is an enlarged detail sectional elevation view of the shift key and lock mechanism, taken on a line corresponding to line 46—46 of Fig. 3. Fig. 21 is a transverse detail sectional elevation on line 20—20 of Fig. 20, showing details and the arrangement of certain parts of the shift mechanism. Fig. 22 is an enlarged detail front elevation of a modified form of shifting type bar support and connections for the type-bar hanger with an improved modified form of such hanger, a portion of the screw connections being shown in section. Fig. 23 is a detail transverse sectional view, on a line corresponding to line 77—77 of Fig. 22, showing details of construction and connections for the said modified type-bar hanger. Fig. 24 is an enlarged detail view of the type-bar guide appearing in Fig. 22. Fig. 25 is a further modification of the type-bar hanger and connections for the same to the shiftable type-bar support. Fig. 26 is a longitudinal sectional elevation view through a modified form of machine in which a simplified construction of comb is used for guiding the rock levers and in which a modified connecting means and tension spring is provided for the said rock lever. Fig. 27 is a detail view of a portion of a modified type-bar support. Fig. 28 is an angular plan view of an improved comb used in this connection in Fig. 26.

In the drawing, all of the sectional views are taken looking in the direction of the little arrows at the ends of the section lines, and similar numerals of reference refer to similar parts throughout the several views.

Referring to the numbered parts of the drawing, 1 is the base of the machine; 2—2 are the sides of the casing, resting on said base and secured thereto; 3—3 the side panels which are in the casing sides 2; and 4 is the front of the casing, constituting a guard and shield for the type when the type-bars are at rest in the type basket, and is supported on the sides of the casing.

5—5 are the sides of the frame, as distinguished from the casing, resting upon the base 1, to which they are secured by suitable screws, or otherwise.

6 is the back frame, also constituting the rear upper part of the outer structure or casing, which rests upon and is secured to the upper back portion of the two sides 5, and carries the escapement mechanism, and the spring drum; and to which are also attached for support, the line-lock, margin-stop, bell mechanism and other similar devices.

7 is the type-bar segment support, and the segment carries the type bar hangers and the type bars together with the type basket and said segment support is secured to the sides of the frame by a pair of links 8—8 and a pair of links 9—9 on the rod 10. This segment, in addition to carrying the type-bars and type-basket, also carries the type-bar guide which is secured thereto.

11 is the carriage support, containing the carriage ways and ball races, and it rests upon the top of the two sides 5, to which it is detachably secured by suitable means so that the entire carriage mechanism, with the platen, can be taken from the machine and a different one, or one of different length, at once substituted.

12 is the rear frame bar of the ribbon mechanism, which supports the ribbon mechanism, the universal bar, and other connected devices. It is secured to the sides 5—5 of the frame by suitable means.

13 is the front frame bar support of the ribbon mechanism, resting on the base 1 to which it is suitably secured. It supports and carries the ribbon spools, the driving means therefor, and also the shift buttons for shifting the ribbon.

14 is the support of the rock levers of the type actions, constituting a cross bar of the machine frame, and is secured on top of the base 1.

I shall now describe the various parts of my improved typewriter in the following order: First, the base and key levers, spacer bar and equalizer, and other mechanisms contained therein, as illustrated in Fig. 8. Second, the shiftable type-bar support, which I will call the type-bar segment, and its connections and means of adjustment, appearing in Figs. 7 and 8, and other figures, which will be identified, and the shifting lever mechanism, connections and lock therefor, detailed in Fig. 19. Third, the type-bar hanger, and means of attaching the same to the said type-bar segment. Fourth, the type action as a whole, including the rock levers and the means of supporting the same.

The key levers 15 are pivoted to the rear of the machine base, and are held upwardly by their connection into the slots of the comb 16, which is secured by screws 17 to the cross bar 18, situated toward the upper front portion of the base 1. The key levers strike against the leather buffer 19 on the wooden bar 20, which is arranged beneath the cross bar 18, which supports the same. Hooks 21 are on the upper side of each key lever for engagement by the line-lock bar, hereafter to be described. A loop 22 is secured to each key lever 15 for engagement with the rearwardly-projecting arm or finger of its corresponding rock lever. The rear end of each of the key levers is pivoted on a pivot 23, which extends transversely through the slotted hanger 24. This hanger is drawn upwardly by a screw 25, which is arranged within a screw threaded sleeve 26, which has a tapered hole at the bottom to receive the upper tapered ends of the hanger 24,—see Fig. 17 for details. The adjustable sleeve 26 is screw-threaded into an inwardly-turned flange or ledge 27 at the rear of the base 1.

The type-bar segment 7, with its support, is shown in perspective in Fig. 7. The semicircular segment 49 is provided for the attachment of the type-bar hangers. The type-basket 50, which is suitably cushioned, is carried by a pair of arms 51—51, which are secured to this segment. The segment 7, as before remarked, is carried by pairs of links 8—8 and 9—9, and all of said links are of the same length and parallel and are pivoted to the frame—the links 8—8 on pivot pins, and the links 9—9 on the rod 10 of the machine—so that the segment moves up and down with a parallel movement. Above the segment 49 is supported the type-guide 52, which is carried by an arm or bar 53, which extends across the upper part of the segment where it is secured by screws 54—54 and supports the said guide in position. Below the guides 52 is a curved striking bar 55, which is of spring construction, so that the type-bars contact with the same slightly at the printing point. This insures that the type will be repelled from the platen after printing, and blurring will thus be avoided. These parts and the added weight of the type-bars, of course, makes this structure quite heavy, and it is found desirable to counterbalance the same. This counter-balancing is done by the coiled counterbalance spring 56, which is on the rod 10, and is secured to an adjustable collar 57, which is provided with a worm gear on its outer periphery. In this meshes the slotted screw 58, which acts upon the gear exactly like a worm gear, when adjusted by a screw-driver. This screw is supported in the hub 58' of the arm 9, so that it effectively puts tension upon the spring, and counterbalances the segment and its parts.

The arm 59 is an extension of the arm 9 beyond the rod 10 for controlling the same. This is controlled by a lever 60, in the base 1 of the machine, which is connected to the said arm 59 by a link 61—see Fig. 9. The rear end of the lever 60 is pivoted to an adjustable fulcrum 62 at the rear of the base, which fulcrum is exactly similar to the fulcrum of one of the type levers, and enables the adjustment of the lever in the same way. The front end of the lever 60 is provided with a finger button 63. The front end of the lever is suitably guided by slotted guide 64' on the plate 64, secured to the inside of the base of the machine by screws 65—65. A projecting lug or finger 66 is secured to the side of the lever 60,—see Fig. 21.

A lock is provided for the lever 60 to hold it in the depressed position, consisting of the lever 67, which is provided with a finger piece 68 at the front, and is pivoted at 67' inside the plate 64. An oblique lug 69 is provided at the inner end of the lever 67 and coöperates with the finger 66 on the lever 60 as clearly appears from Figs. 20 and 21. The lever 67 is held upward by the spring 71, which is connected to it and to a downwardly-projecting finger 70 on the plate 64. Stop lugs 72 and 73 are above and below the lever 67 and limit the motion of the same. It will thus be seen that, when the lever 60 is depressed, the finger 66 acts upon the yielding oblique catch 69 and passes below the same, and is engaged by it, as the catch is urged forward by the spring 71, to lock the same, so that, when the lever 60 is depressed, it is locked in position. To release the lever, the finger piece 68 is depressed, when the catch 69 will be moved backward and the finger 66 released, and the lever 60 allowed to rise.

A lever 74, exactly similar to the lever 60, and with the same connection, is toward the left hand side of the machine. It is not provided with any locking means, so that, when this lever 74 is depressed, the operator must hold it down with his finger until the writing in the shifted position is completed, when it will immediately rise on being released by the removal of the finger. It is nceessary, to depress the lever 60, to bring the lock into operation.

The segment 49 on the segment support 7 has a double row of holes 49'—49'' for attaching the type-bar hangers adjustably thereto. The type-bar hangers 75 are notched on opposite sides at 76 and 77, the notch 76 being opposite the hole 49', and the notch 77 being opposite the hole 49''. Adjacent hangers are symmetrical. Screws 78 are inserted into the holes 49′, which are screw-threaded to receive the same, and the screws 79 are screw-threaded into the holes 49″, each screw extending over and clamping the adjacent hanger. The plate 80 of thin, flexible metal, rests on the tops of these hangers, and is clamped against the same by the screws. By this means, each screw clamps tightly only the hanger in juxtaposition at each side. The screws are staggered, so that there is but a single screw for each hanger, but, as the screws extend between the hangers, each hanger is supported by two screws. This is of great advantage in adjusting the hanger and locating the same properly in the machine, because, by loosening one screw, the hanger can be swung from side to side, and, by loosening both, it can be moved bodily out and in, and, for that matter, removed, and, at the same time, while each hanger is clamped by a pair of screws, there is but a single screw made use of for each hanger. The hangers extend radially upward from the gate and to the upper inner end of the same are secured the thin type-bars 81 by a suitable pivot 82. The connections for operating the type-bar will be considered in reviewing the type action.

The type-bar action will now be specifically considered.

Between the key-levers 15 and the type-bars 81, both already described, is arranged, in each instance, an intermediate rock lever 83, which projects upwardly and is connected by the top coupler 89 to the type-bar 81. A finger or arm 84 extends rearwardly from this rock lever, and is embraced by the loop 22 on the key-lever 15, already referred to. The details of this arrangement distinctly appear in Fig. 8. The transverse rock lever support 14 is formed into a comb by kerfs 14′, which comb is slotted longitudinally of the bar, and within the slot is arranged a pivot wire 85. Each rock lever 83 is slotted at 85′ for insertion on the pivot wire 85. The rock lever is held in place by a tension spring 86, all of which tension springs are secured to a common bar 87, which is made adjustable by a series of screws 88 in slots in the bar 87, such bar being thus adjustably secured to the transverse bar 14.

The top coupler 89 has a rearwardly-extending part 90, especially adapted for contact with the universal bar of the escapement mechanism. The top coupler is made up of side strips of spring metal 91—92, which are effectively retained together by a band of sheet metal 93 embracing the same. The details of this appear distinctly in Figs. 14 and 15. The coupler is secured to the type-bar by the pivot 94, which is shouldered at 94′ and is fixed on the member 91, only, and the member 92 opens so that, by springing the sides 91—92 apart, the coupler can be readily attached or detached from the type-bar. An exactly similar pivot 95, shouldered at 95′ is toward the rear, and connects the coupler to the upper end of its appropriate intermediate rock lever. By this construction, it will be noted that the operation of the universal bar or of the escapement mechanism is very effectively accomplished in close proximity to the type-bars, thus avoiding any lost motion between these parts. The top coupler is very simple to manufacture, and is very effective in use. This structure can be somewhat modified as well as the structure of the type-bar hanger support, as will appear from the consideration of modifications farther on in this specification.

I desire to remark that the type bar hangers can be considerably modified. They may be formed of a strip of bar metal, see Figs. 22 and 23, with a half circular loop 550 formed therein to accommodate the screw. A single screw is thus used for each, which will somewhat overlap on the adjacent hanger to assist in retaining the same. In Fig. 25, I show a still further modification, in which the hangers 551 are bent symmetrically so that the screws 78 lap equally onto the adjacent hangers.

The modification of the type-bar action is also shown particularly in Figs. 26 and 27. The rock levers 83 are provided substantially the same as the rock levers 83 already illustrated and described. However, the type-bars are supported on double arc segments in the type-bar support. The tension springs for the said rock levers are also modified which occasions the modification appearing at 580. The segment 582 is divided into two concentric arcs or segments 583 and 584, see Fig. 27, to which are secured the short type-bars 585 and the longer type bars 586, which rest in the double cushion type-basket 589. The said type-bars are secured in place by screws 588 through hangers 587, which screws are inserted into the apertures 588′ occurring in the double segments of the said type-bar support. A double comb 590 is provided for guiding these rock levers. The levers 581 are curved and extend upwardly above the short type levers 83 and are embraced by the guide notches 593 at the ends of the comb teeth 591. Spaces 592 between the teeth are provided for guiding short levers 83. The tension on the springs for the rock levers is independently adjustable in this modification. On the cross bar 580 on which the rock levers are supported are separate screws 594, for putting tension on each of the springs 86, the tensions on which screws are adjustable by the nuts 595 on the front ends thereof. These are secured in place by brackets 560, which brackets are secured by means of set screws 591′.

Having thus described my invention, what I claim as new and desire to secure by Letters Patent is:

1. In a typewriting machine, the combination of a suitable base containing the key levers and their pivotal supports; frame sides carried on said base; a cross top bar toward the rear of said machine for carrying escapement mechanism; a carriage supporting bar containing suitable ways resting upon the said side pieces, with a carriage thereon; transverse bars secured to said side pieces and resting on the said base for carrying ribbon mechanism; a shiftable segment for carrying the type-bar hangers and typebasket secured by suitable shifting connections to the sides of the said frame and suitable casings to each side for incasing and protecting the working parts, coacting for the purpose specified, the said several parts with their attached mechanism being capable of separate manufacture.

2. In a typewriting machine, the combination of a suitable base with cross bars carrying the key levers and their intermediate connecting parts; frame sides supported on the said base; suitable cross bars on the said sides, a rear bar for carrying escapement mechanism, and a pair of front bars for carrying the ribbon mechanism; a transverse carriage bar support containing suitable ways and means for securing it to the frame sides; and a carriage with balls and ballraces supported on the said carriage ways, all capable of construction as separate devices whereby the various separate devices can be constructed separately and assembled together, coacting for the purpose specified.

3. In a typewriting machine, a base casting containing the key levers with their fulcrums; sides arranged to rest on said base, cross bars on said base carrying the fulcrums for the intermediate levers; cross bars on the said sides for supporting the escapement dog mechanism and ribbon mechanism independently; a type-bar segment pivotally supported on said sides; a detachable carriage-bar support across the top of the said machine; and a carriage extending longitudinally thereof, coacting for the purpose specified.

4. A typewriting machine, provided with a frame divided up into unitary parts to support the various mechanisms of the machine each as a unitary structure; a base carrying the keys; sides affording connections and support to the type-bar segment; a cross bar affording a support to connections for intermediate levers; an upper rear bar affording a support for a unitary escapement dog mechanism; cross bars for carrying ribbon mechanism; a cross bar affording a support for a unitary carriage construction; and a casing surrounding the same, coacting as specified.

5. A typewriting machine, provided with a frame divided up into unitary parts to support the various mechanisms of the machine, each as a unitary structure; a base carrying the keys; sides for carrying the type-bar segment; a cross bar for carrying intermediate levers; an upper rear bar for carrying a unitary escapement dog mechanism; cross bars for carrying the ribbon mechanism; and a cross bar for carrying a unitary carriage construction, coacting as specified.

6. In a typewriting machine, made up of detachable unitary structures, a base structure containing key mechanism as a detachable unitary structure; a suitable crossbar for carrying the escapement dog means as a separable unitary structure; a suitable carriage supporting bar for carrying the carriage mechanism; suitable detachable unitary structures for carrying the typebasket and shifting means; and suitable cross bars for carrying the ribbon drive mechanism and the ribbon vibrator mechanism, respectively, as unitary structures, coacting for the purpose specified.

7. In a typewriting machine, the combination of a shifting lever, a bracket secured to the side of said shifting lever and provided with a laterally projecting flange, a guide plate secured to the frame and provided with a slot in which said shifting lever is guided, a locking lever pivoted on said frame having a rearwardly projecting arm provided with a finger for actuating the same and having a downwardly projecting arm with an inclined laterally projecting flange for engaging the laterally projecting flange on said bracket, and a spring connected to said guide plate and to said downwardly projecting arm for holding the said locking lever normally in the engaging position.

8. In a typewriting machine, a type action consisting of a suitable key lever pivotally supported in the base of the said machine; a loop formed by a strip of metal secured thereto; an intermediate rocking lever suitably notched and supported in a comb on a pivot; a spring for retaining the same normally in position so that the notch engages the pivot, the said intermediate lever having an upwardly-projecting arm; a type-bar support; a type bar connected thereto by a suitable hanger; a top coupler consisting of a pair of metal bars pivotally connected to said type-bar and the upper end of said intermediate lever, the rear portion of said top coupler projecting beyond the said lever; said rear portion being adapted to actuate escapement mechanism, all coacting substantially as described and for the purpose specified.

9. In a type action for typewriting machines, the combination of a suitable key lever; type-bars on a suitable support; intermediate levers coupled to the said key-levers and having upwardly-extending arms; top couplers for connecting said arms and type bars consisting of pairs of opposed spring members with intermediate pivots, the said top couplers extending rearwardly of the said intermediate lever arms, a universal bar supported in the said frame and to the rear of the said top couplers to be actuated by contact with the rear ends thereof; and connections from the said universal bar to the escapement mechanism, all coacting substantially as described and for the purpose specified.

10. In a type action for typewriting machines, the combination of a key lever; a type-bar carried on a suitable support; an intermediate lever between the said key lever and the type-bar, having an upwardly-projecting arm; a top coupler for the upper end of said intermediate lever and the said type-bar extending rearwardly beyond the said arm; a universal bar supported on a parallel coupling to insure its parallel movement; an escapement mechanism; and connections from said universal bar to said escapement mechanism, coacting as described.

11. In a type action for typewriting machines, the combination of a key lever; a type-bar carried on a suitable support; an intermediate lever between the said key lever and the type-bar having an upwardly projecting arm; a top coupler for the upper end of said intermediate lever and the said type-bar, said coupler extending rearwardly beyond the said arm; a universal bar arranged to be actuated by contact of the rear ends of said coupler; and an escapement mechanism arranged to be actuated by said universal bar.

12. In a type action for typewriting machines, the combination of a key lever; a type-bar carried on a suitable support; an intermediate lever between the said key lever and the type-bar and having an upwardly projecting arm; a top coupler for the upper end of said intermediate lever and the said type-bar, said coupler extending rearwardly beyond the said arm; and an escapement mechanism actuated by contact with said coupler.

13. In a type action for typewriting machines, the combination of a key lever; a loop secured thereto open in the longitudinal direction of the said key lever; an intermediate lever for coupling the said key lever to the type-bars, having a rearwardly projecting finger arranged in said loop and an upwardly-projecting arm, said lever being notched at its central portion to embrace a fulcrum; a slotted bar transversely across the machine with suitable transverse guide kerfs therein to receive said intermediate lever; a fulcrum rod longitudinal of said bar and extending across said kerfs in a suitable seat for receiving the notch on said intermediate lever; an adjustable spring coupling connected from the central portion of said lever to the said lever support; a type-bar pivoted on a suitable support and resting in a type-bar basket; and a coupling from the said intermediate lever to the said type-bar, whereby the said spring urges the said type-bar into the said basket, coacting for the purpose specified.

14. In a type action for typewriting machines, the combination of the key lever; an intermediate lever for coupling the said key lever to the type-bar, said lever being notched at its central portion to embrace a fulcrum; a slotted bar transversely across the machine with suitable transverse guide kerfs therein to receive said intermediate lever; a fulcrum rod longitudinal of said bar and extending across said kerfs in a suitable seat for receiving the notch on said intermediate lever; an adjustable spring coupling connected from the central portion of said lever to the said lever support; a type-bar pivoted on a suitable support and resting in a type-bar basket; and a coupling from the said intermediate lever to the said type-bar, whereby the said spring urges the type-bar into the said basket, coacting for the purpose specified.

15. In a type action for typewriting machines, the combination of the key lever; a loop secured thereto, open in the longitudinal direction of the said key lever; an intermediate lever for coupling the said lever to the type-bar, having a rearwardly-projecting finger arranged in said loop and an upwardly-projecting arm, said lever being notched at its central portion to embrace a fulcrum; a slotted bar transversely across the machine with suitable transverse guide kerfs therein to receive said intermediate levers; a fulcrum rod longitudinal of said bar and extending across said kerfs in a suitable seat for receiving the notch on said intermediate lever; a spring coupling connected from the central portion of said lever to the said lever support; a type-bar pivoted on a suitable support; and a coupling from the said intermediate lever to the said type-bar, coacting for the purpose specified.

16. In a typewriting machine, the combination of an intermediate lever, with connections to a key lever; a type bar; a top coupling between the said intermediate lever and the said type-bar consisting of a pair of springs suitably joined together at their centers and perforated at one end and at a little distance from the opposite end; and shouldered pivots retained between the said spring members, the projecting end of the said top coupling being adapted to actuate escapement mechanism.

17. In a typewriting machine, the combination of a type-bar segment; a type-bar pivotally mounted thereon; a key lever; an intermediate lever having an upwardly-projecting arm; a top coupler between the upper portion of said arm and the said type-bar, having a rearwardly-extending portion beyond the connection thereof; and a universal bar in position to be acted upon by the said rearwardly-projecting portion of said top coupler, coacting as specified.

18. In a typewriting machine, the combination of a suitable shiftable type bar support, having double concentric segments for the support of the type bars of different lengths; a suitable cross bar in the base of the machine; intermediate levers supported on the said fulcrums and acted upon by the said key levers and having series of upwardly-projecting arms, those for engagement with the type bars of the outer segment being short, and those for engagement with the type bars of the inner segment being long and extended above and curving over the said shorter arms, whereby the actuating ends of said arms lie in substantially the same plane; a comb guide for said arms formed of a curved bar of sheet metal and slotted to correspond thereto; top couplers between the said intermediate levers and the type bars having rearwardly-projecting end portions; and a universal bar consisting of a broad plate arranged in a plane in proximity to the said top couplers whereby the same will be acted upon by the said top couplers, coacting for the purpose specified.

19. In a typewriting machine, the combination of a suitable shiftable type bar support, having double concentric segments for the support of the type bars of different lengths; a suitable cross bar in the base of the machine bearing suitable fulcrums; key levers in the base of the machine; intermediate levers supported on the said fulcrums and acted upon by the said key levers; top couplers between the said intermediate levers and the type bars having rearwardly-projecting end portions; and a universal bar consisting of a broad plate arranged in a plane in proximity to the said top couplers whereby the same will be acted upon by the said top couplers, coacting for the purpose specified.

20. In a typewriting machine, the combination of a suitable shiftable type bar support, having double concentric segments for the support of the type bars of different lengths; a suitable cross bar in the base of the machine bearing suitable fulcrums; key levers in the base of the machine; intermediate levers supported on the said fulcrums and acted upon by the said key levers; top couplers between the said intermediate levers and the type bars; and a universal bar consisting of a broad plate arranged in a plane in proximity to the said top couplers whereby the same will be acted upon by the said top couplers, coacting for the purpose specified.

21. In a typewriting machine, the combination of a suitable shiftable type bar support, having double concentric segments for the support of the type bars of different lengths; a suitable cross bar in the base of the machine, intermediate levers supported on the said fulcrums and acted upon by the said key levers and having series of upwardly-projecting arms; a comb guide for said arms formed of a curved bar of sheet metal and slotted to correspond thereto; top couplers between the said intermediate levers and the type bars having rearwardly-projecting end portions; and a universal bar consisting of a broad plate arranged in a plane of proximity to the said top couplers whereby the same will be acted upon by the said top couplers, coacting for the purpose specified.

22. In a key lever mechanism for typewriters, the combination of the key levers; a fulcrum hanger for each key lever; an externally screw-threaded sleeve embracing the upwardly projecting shank on the hanger; a lock nut screw-threaded to the upper end of the hanger; and a transverse fulcrum bar for receiving the said adjustable fulcrum, all coacting for the purpose specified.

In witness whereof, I have hereunto set my hand and seal in the presence of two witnesses.

WILLIAM R. FOX. [L. S.]

Witnesses:
KATHRYN NIBLACK,
CLARA E. BRADEN.